UNITED STATES PATENT OFFICE.

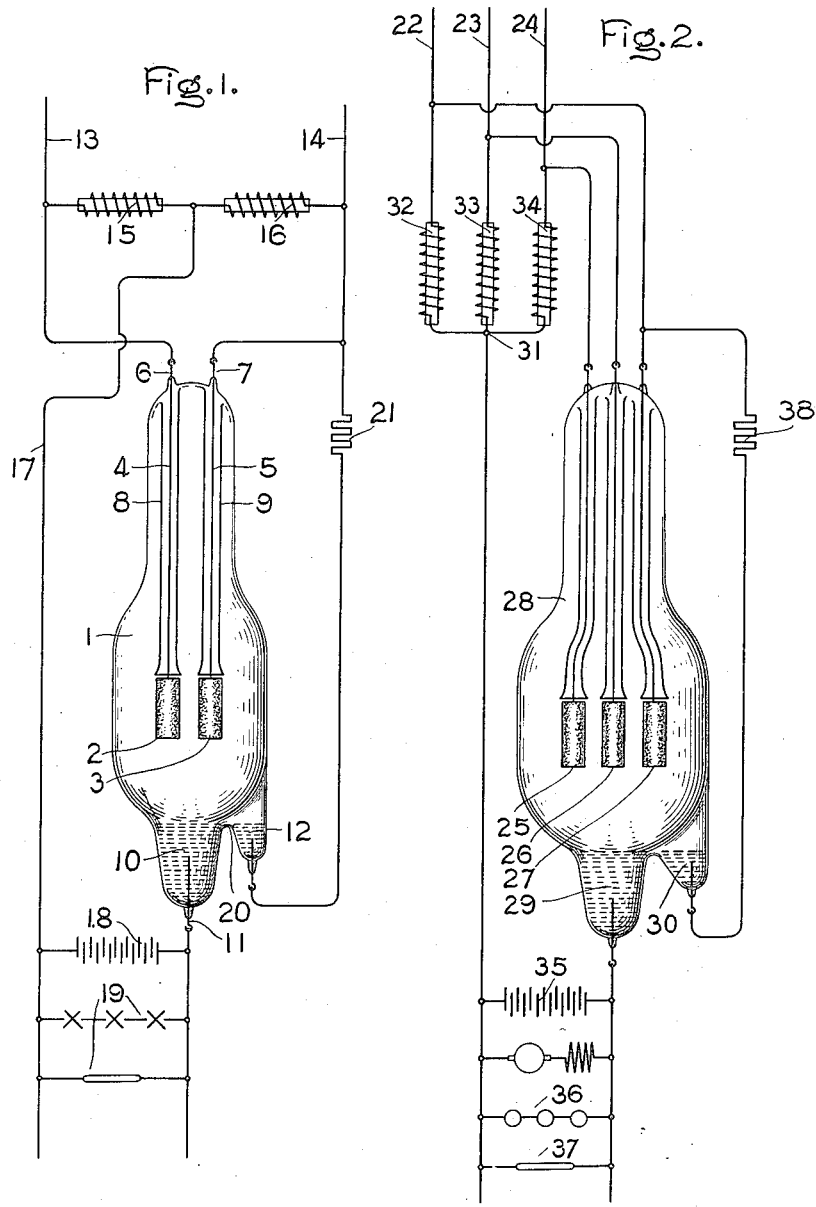

OSIAS O. KRUH, OF SCHENECTADY, NEW YORK, ASSIGNOR TO GENERAL ELECTRIC COMPANY, A CORPORATION OF NEW YORK.

VAPOR ELECTRIC CONDUCTOR.

No. 916,879.　　　　Specification of Letters Patent.　　Patented March 30, 1909.

Application filed July 11, 1903. Serial No. 165,053.

*To all whom it may concern:*

Be it known that I, OSIAS OTTO KRUH, a subject of the Emperor of Austria-Hungary, residing at Schenectady, county of Schenectady, State of New York, have invented certain new and useful Improvements in Vapor Electric Conductors, of which the following is a specification.

My present invention relates to vapor electric conductors and more especially to an arrangement of vapor conductor for rectifying alternating current.

One of the objects of my invention is to simplify the arrangement and cheapen the construction of apparatus of this character.

To this end the invention comprises certain features of novelty which I have pointed out with particularity in the appended claims and which I have embodied in a rectifying apparatus described in detail in the following specification which is to be taken in connection with the accompanying drawings in which—

Figure 1 represents a single phase rectifier embodying my invention, and Fig. 2 a three phase rectifier also embodying my invention.

The drawings are intended as illustrations of some of the many forms which my invention may assume in practice.

In Fig. 1 the envelop for the vapor conductor is indicated at 1. This envelop is enlarged at its lower portion so as conveniently to contain a plurality of electrodes 2, 3 of artificial graphite, steel or other suitable material. These electrodes are supported by means of iron wires 4 and 5 which in turn are connected to platinum leading-in wires 6 and 7. Glass tubes 8 and 9 surround the respective iron wires throughout their entire length as indicated and are flared at their lower ends so as to extend over the tops of the electrodes 2 and 3.

The bottom portion of the envelop 1 is contracted so as to form a pocket for the reception of a body of mercury 10, constituting one of the main electrodes of the apparatus. Electrical connection is made with the mercury electrode 10 by means of one or more leading-in wires 11. The envelop 1 is also provided with a small pocket arranged adjacent to the electrode 1 and filled with a body of mercury 12 which serves as a starting electrode in a manner presently to be described. The circuit supplying the alternating current to be rectified is indicated conventionally by the mains 13 and 14 extending from some source of alternating current. Across these mains are connected two inductance coils 15 and 16 in series with each other. Connections are made between the source and the rectifier as follows: Leads extend from the mains 13 and 14 and are connected respectively to the leading-in wires 6 and 7 communicating with the main electrodes or anodes 2 and 3. The circuit carrying the rectified current is connected at one end by a lead 17 to the junction between the inductances 15 and 16 and at the other end to the leading-in wire or wires 11 which makes connection with the main electrode or cathode 12. In this circuit are connected any desired translating devices such for example as a storage battery 18, or electric lights 19 of any desired character such for example as incandescent lamps, mercury vapor lamps or the like.

In order to provide for starting the rectifier thus described the starting electrode 12 is connected to one of the mains 13 and 14, in this case to the main 14. This connection having been made the apparatus is started by shaking or otherwise causing the mercury bodies 10 and 11 temporarily to flow over the bridge or wall 20 by which they are separated. When this is done, a circuit is completed extending from the main 14 to the electrode 12, then across the bridge of mercury to the electrode 10, thence through the circuit afforded by the translating devices, or by a resistance inserted in place of the translating devices for purposes of starting and, after passing through the resistance or translating devices, is completed through the inductance coil 15 to the other main 13. The mercury which completes this circuit between the electrodes 10 and 12 remains but momentarily on the bridge 20 so that when it separates the current then flowing produces an arc. This arc causes ionized mercury vapor to be set free from the electrode 10. This ionized vapor, through the propagation of its ions in the exhausted envelop 1, causes an arc to be struck between the electrode 2 and the mercury electrode 10, the circuit of which arc may be traced from the main 13 to the electrode 2, then through the arc to the electrode 10 and, after passing through the translating devices such as 18, 19, to the junction between the inductance coils 15 and 16 and back to the other main 14 through the medium of inductance coil 16. When the rectifier has been thus started, the two arcs from the electrodes 2 and 12 to the cathode 10 mutually sustain each other by reason of the fact that they occur at such overlapping time intervals that when either one tends to start, the other is furnishing mercury ions from the mercury electrode 10 to accomplish the starting.

After the arcs have been started as above described, the arc from the starting electrode 12 tends to transfer itself to the electrode 3 which is electrically connected to the same supply main as the electrode 10. This tendency I purposely greatly increase by inserting in series with the electrode 12 an inductance or resistance 21 formed for example, if a resistance, of a piece of iron wire. This resistance or inductance 21 causes the almost immediate starting of the main arcs between the main electrode or anode 3 and the main electrode 10 and after the arc has been started reduces the current flowing to the starting electrode 12 to a negligible amount. Instead of the resistance I may however, if desired, use a mechanical cut-out, the solenoid of which may be connected in circuit with the lead extending to the electrode 3.

In the foregoing description I have described my invention as applied to a single phase rectifier but it is to be understood that its various features of novelty are applicable in other relations as well. Thus I may employ the same starting arrangement in connection with other rectifying devices, as for example the three phase rectifier shown in Fig. 2. In this figure the three-phase mains are indicated at 22, 23 and 24 and to these mains current from any suitable alternating source is supplied. These mains are connected respectively to the three electrodes 25, 26 and 27 of a vapor rectifying device similar in many respects to that shown in Fig. 1. This device is provided with the exhausted envelop 28 in which the electrodes before mentioned are located. In the bottom of the envelop 28 is a main mercury electrode 29 and a coöperating starting electrode 30. In connecting up the apparatus the electrodes 25, 26 and 27 are connected respectively to the supply mains 24, 23 and 22, while the coöperating main electrode 29 is connected to one end of a circuit, the outer end of which extends from the junction 31 between three reactive coils 32, 33 and 34 connected Y-fashion between the three supply mains 22, 23 and 24. In this circuit the devices which are to be supplied with direct current are connected. These devices may be of any desired character such for example as a storage battery 35, incandescent or vapor lamps 36 and 37 or the like. The starting electrode is connected through a resistance or reactance 38 to some one of the supply mains as for example the main 22. The apparatus thus described starts up in much the same manner as that set forth in connection with the description of the operation of Fig. 1 and therefore will be understood without further explanation.

What I claim as new and desire to secure by Letters Patent, is,—

1. The combination of a source of alternating current, mains extending therefrom, a plurality of anodes connected respectively to said mains, a cathode coöperating with said anodes, inductance coils connected respectively to said mains and joined together at a common point, a consumption circuit extending between said common point and said cathode, and a single starting electrode located adjacent to said cathode and connected to receive current from said source of alternating current.

2. The combination of a source of alternating current, mains extending therefrom, a plurality of anodes connected respectively to said mains, a cathode coöperating with said anodes, inductance coils connected respectively to said mains and joined together at a common point, a consumption circuit extending between said common point and said cathode, a single starting electrode connected to receive current from said source, and means for limiting the current passing to said starting electrode.

3. The combination of an exhausted envelop, a vaporizable electrode therefor, a plurality of non-vaporizable electrodes located in operative relation to said vaporizable electrode, and a single fluid starting electrode located in proximity to said vaporizable electrode and receiving current from the same source as one of said non-vaporizable electrodes.

4. The combination of an exhausted envelop, a main vaporizable electrode, a plurality of coöperating non-vaporizable electrodes, and means for starting an arc between one of said non-vaporizable electrodes and said vaporizable electrode consisting of a starting electrode located adjacent to said vaporizable electrode and receiving current from the supply circuit of said non-vaporizable electrodes.

5. In a vapor conductor, the combination of an exhausted envelop, a vapor-emitting main electrode, a plurality of non-vaporizable electrodes, and means for starting current flow between the vaporizable electrode and each of said non-vaporizable electrodes, said means consisting of a single starting electrode located adjacent to said vapor-emitting electrode and fed from the same source of current as the other electrodes.

6. In a vapor conductor, the combination of an exhausted envelop, a vapor-emitting main electrode, a plurality of non-vaporizable electrodes, and means for starting current flow between the vaporizable electrode and each of said non-vaporizable electrodes, said means consisting of a single fluid electrode located adjacent to said vapor-emitting electrode and supplied with energy from an alternating current source.

7. In a vapor conductor, the combination of an exhausted envelop, a vapor-emitting main electrode, a plurality of non-vaporizable electrodes, and means for starting current flow between the vaporizable electrode and each of said non-vaporizable electrodes, said means consisting of a single starting electrode located adjacent to said vapor-emitting electrode and in contact-making relation thereto.

8. The combination of a source of alternating current, mains extending therefrom, a plurality of anodes connected respectively to said mains, a cathode coöperating with said anodes, a single fluid starting electrode adapted to make contact with said cathode, and electrical connections for supplying starting current to said starting electrode from said source of alternating current.

9. The combination of a source of alternating current, an exhausted envelop, a mercury cathode, a plurality of main anodes, connections from said main anodes to said source, a single starting anode adapted to make contact with said mercury cathode, and an electrical connection from said starting anode to said source of alternating current.

10. In a vapor conductor, the combination of an exhausted envelop, a vapor emitting main electrode, a plurality of non-vaporizable electrodes, and means for starting current flow between the vaporizable electrode and each of said non-vaporizable electrodes, said means consisting of a single starting electrode located in operative relation to said vapor emitting electrode and connected with a non-vaporizable electrode through current limiting means.

In witness whereof, I have hereunto set my hand this 8th day of July, 1903.

OSIAS O. KRUH.

Witnesses:
BENJAMIN B. HULL,
HELEN ORFORD.